United States Patent [19]
Mori

[11] Patent Number: 6,003,142
[45] Date of Patent: Dec. 14, 1999

[54] TEST FACILITATING CIRCUIT OF MICROPROCESSOR

[75] Inventor: Junji Mori, Kanagawa-ken, Japan

[73] Assignee: Kabushiki Kaisha Toshiba, Kawasaki, Japan

[21] Appl. No.: 08/988,475

[22] Filed: Dec. 10, 1997

[30] Foreign Application Priority Data

Dec. 10, 1996 [JP] Japan .................................. 8-329892

[51] Int. Cl.⁶ .................................................. G06F 11/00
[52] U.S. Cl. .............................. 714/30; 714/47; 714/48; 714/718
[58] Field of Search .................... 714/30, 47, 48, 714/718, 719, 720, 723, 730, 731, 31, 49, 41, 43, 54, 56, 715, 36, 32; 710/65, 13, 14; 712/229; 365/201; 364/580

[56] References Cited

U.S. PATENT DOCUMENTS

| | | | |
|---|---|---|---|
| 4,967,387 | 10/1990 | Shibasaki et al. | 364/580 |
| 5,250,895 | 10/1993 | Hariai | 324/158 |
| 5,497,459 | 3/1996 | Tanihira et al. | 714/30 |
| 5,530,804 | 6/1996 | Edgington et al. | 714/30 |
| 5,673,275 | 9/1997 | Garcia et al. | 714/718 |
| 5,712,822 | 1/1998 | Petrosino et al. | 365/201 |
| 5,825,738 | 11/1996 | Momohara | 714/718 |

*Primary Examiner*—Joseph E. Palys
*Assistant Examiner*—Rijue Mai
*Attorney, Agent, or Firm*—Foley & Lardner

[57] ABSTRACT

A test facilitating circuit of a microprocessor has a mode register (11). If data stored in the mode register indicates a test mode, the test facilitating circuit uses a test mode function of a cache memory (1), to execute a test program written in the cache memory irrespective of the resetting of the microprocessor. The test program carries out a built-in test on internal circuits of the microprocessor. Results of the test are stored in the cache memory. After the test, an external tester reads the test results out of the cache memory and examines them.

17 Claims, 8 Drawing Sheets

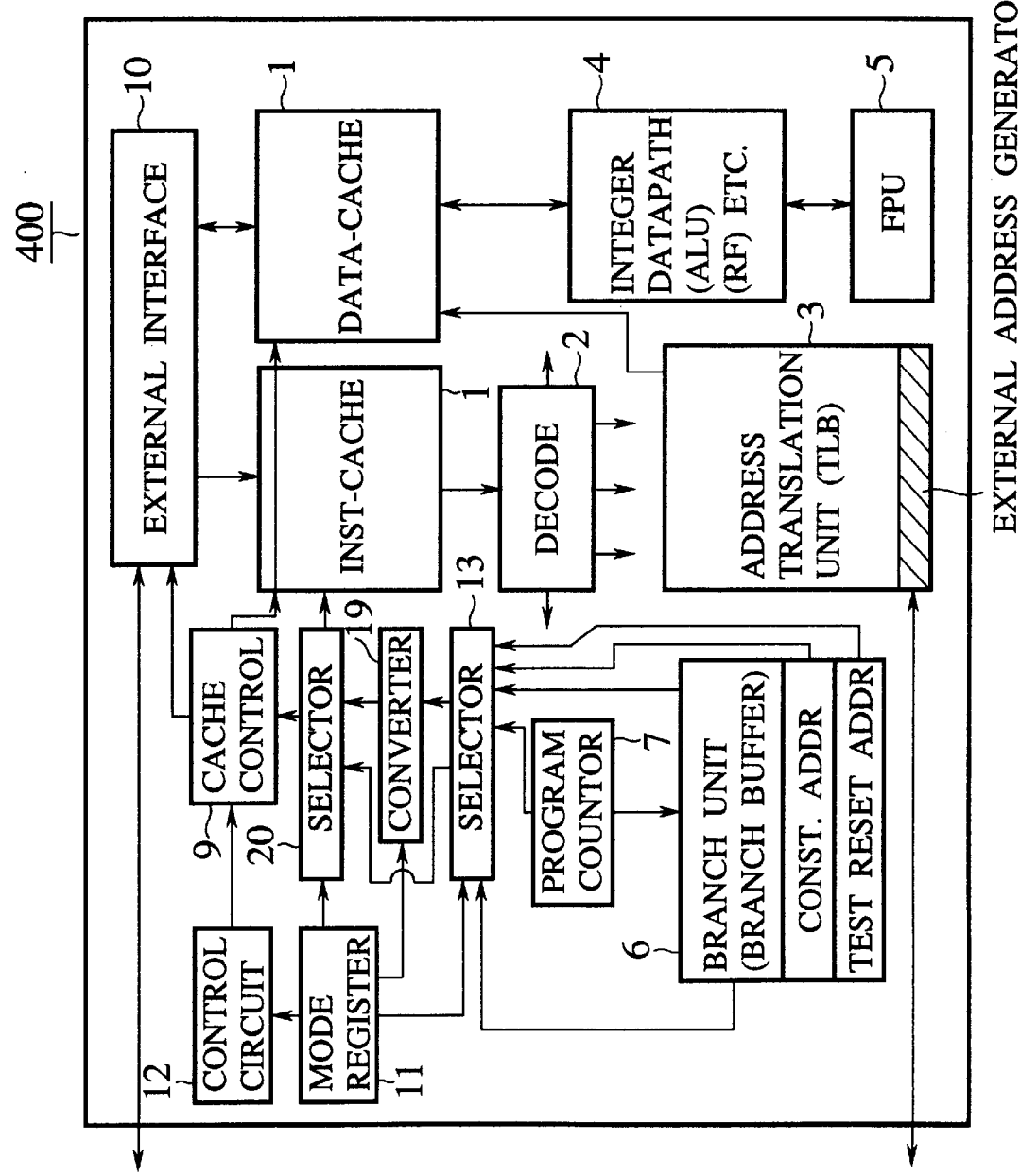

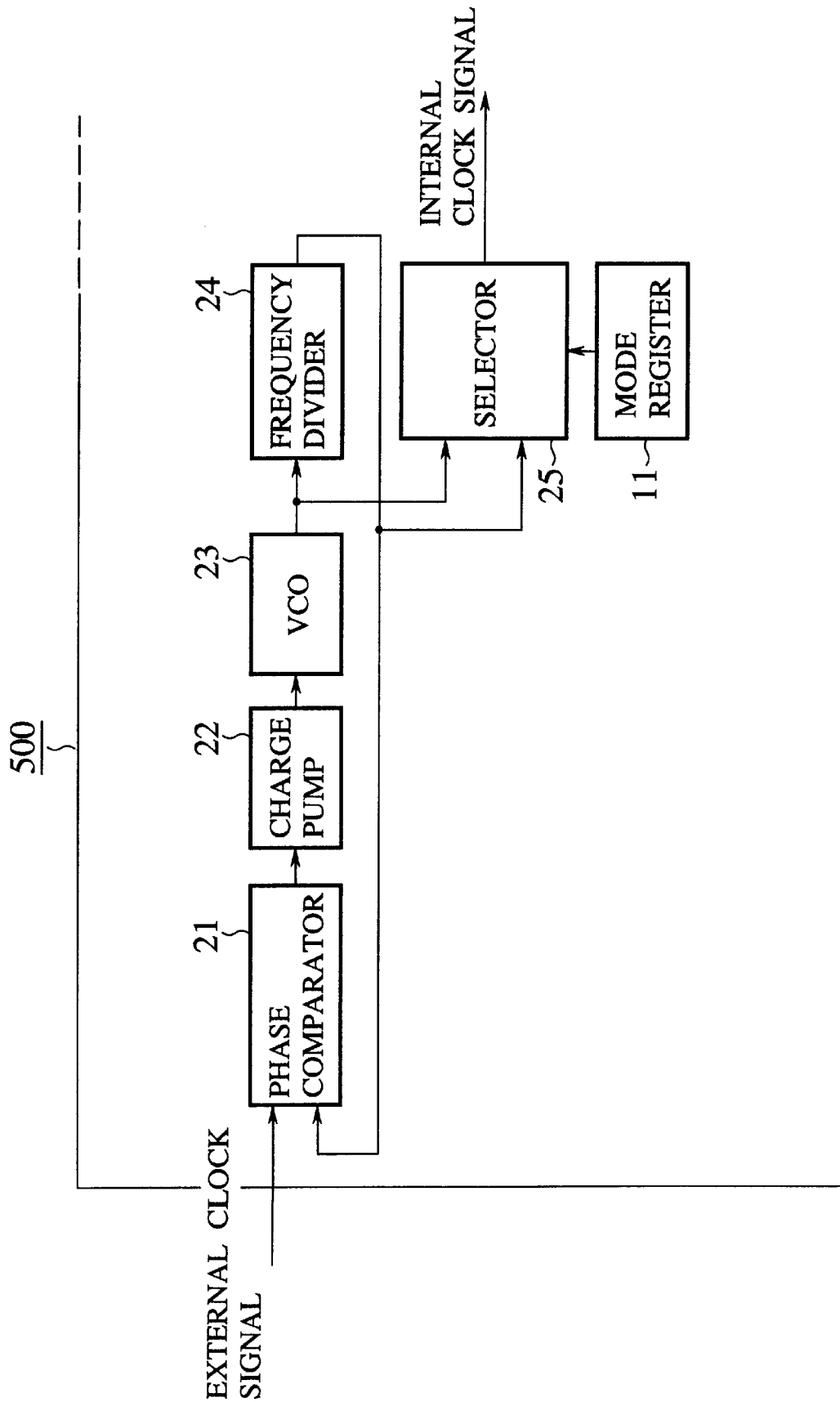

TEST FACILITATING CIRCUIT OF MICROPROCESSOR

BACKGROUND OF THE INVENTION

1. Field of the Invention

The present invention relates to a test facilitating circuit for easily carrying out a built-in test on a microprocessor, and particularly, to a test facilitating circuit that uses a cache memory incorporated in a microprocessor as well as an inexpensive tester, to efficiently test the microprocessor.

2. Description of the Prior Art

FIG. 8 shows a microprocessor having a cache memory, according to a prior art. A built-in test is carried out on the microprocessor.

The microprocessor 800 has a cache memory 1 made of an instruction cache and a data cache, a decoder 2 for decoding an instruction to execute, an address translation unit 3 such as a translation look-aside buffer (TLB) for translating a logical address into a physical address, an operation unit 4 such as an integer data path, ALU, or RF and a floating point unit 5 for executing the instruction decoded by the decoder 2, a sequence control unit 6 such as a branch unit or a branch buffer for controlling the sequence of execution of instructions, a program counter 7, a selector 8 for selecting one of the addresses provided by the sequence control unit 6 and program counter 7, a cache control unit 9 for controlling an access to the cache memory 1 based on the address selected by the selector 8, and an external interface 10 for interfacing data transmission between the outside and the cache memory 1.

The microprocessor 800 has a test mode to test the cache memory 1 by directly writing and reading data to and from the cache memory 1 from the outside. The test mode is used to select good ones among mass-produced microprocessors, and once the microprocessors are shipped, the test mode is not usually used. The test mode is also called the cache test mode in this specification.

The cache test mode externally provides addresses and data to directly access the cache memory 1 and tests whether or not the cache memory 1 has manufacturing defects. Input/output (I/O) pins for passing the addresses and data used for the cache test mode are multiplexed with other pins. The microprocessor 800 may automatically generate the necessary addresses for the cache test mode.

Dotted lines in FIG. 8 indicate address and data paths used in the cache test mode.

When a microprocessor is reset, an uncache/unmap operation is carried out. This operation fetches a first instruction from a specific address that is not in a cache memory and requires no address translation, to execute a boot-up sequence for setting up the microprocessor. The boot-up sequence invalidates the cache memory and initializes a translation look-aside buffer (TLB) used for address translation.

Thereafter, the microprocessor accesses an address in the cache memory 1 or a logical address to be translated into a physical address, to start executing OS (operating system) and application programs.

The microprocessor 800 of the prior art must receive a maximum frequency test before shipment. This test needs a tester that must have higher performance than the maximum performance of the microprocessor 800 to test. Accordingly, the tester is expensive. In addition, the tester must have as many channels as the number of pins of the microprocessor 800 when testing the functions of the microprocessor 800.

Conventional microprocessors have a special cache test mode to test an internal cache memory by directly writing and reading data to and from the cache memory. This mode is not used in a usual operation and is capable of testing the cache memory as if it is a simple memory.

Testers for testing the conventional microprocessors must have higher performance than the maximum performance of the microprocessors, which is improving day by day. Improving the performance of testers results in increasing testing costs.

Recent LSI chips have additional buses such as a bus for a secondary cache, to increase the number of pins of the chips. This results in increasing the number of tester channels that are expensive, thereby further increasing testing costs.

As mentioned above, the performance of microprocessors having an internal cache memory is improving in short periods, and testers for testing the microprocessors must improve their performance accordingly, thereby increasing testing costs.

SUMMARY OF THE INVENTION

An object of the present invention is to provide a circuit for easily and at low cost testing a microprocessor having a cache memory.

In order to accomplish the object, the present invention provides a test facilitating circuit of a microprocessor, for easily testing the microprocessor. The test facilitating circuit involves a mode register for storing control data to selectively set a test mode and a normal operation mode. The test mode tests the microprocessor independently of the resetting of the microprocessor. The test facilitating circuit also involves a cache memory having a cache test mode to allow the outside to directly write and read data to and from the cache memory. The cache test mode function is used to write a test program into the cache memory. The test program is executed in the test mode to test internal circuits of the microprocessor. Test results provided by the test program are stored in the cache memory so that the outside may read the test results out of the cache memory. The test facilitating circuit also involves an address generator for generating a start address to access the test program in the cache memory. The test facilitating circuit also involves a first selector for selecting the start address generated by the address generator when the control data in the mode register indicates the test mode, supplying the selected start address to a cache control unit that controls an access to the cache memory, selecting an address of the test program that follows the start address, and supplying the selected address to the cache control unit. The test facilitating circuit also involves a control circuit for keeping the cache memory in a hit state during the test mode so that no cache miss occurs when the cache memory is accessed during the test mode.

The test facilitating circuit may further involve a shift register for successively compacting the test results into signatures and storing the signatures so that the outside may read the signatures, and a control circuit for controlling the reading and writing of the shift register.

The test facilitating circuit may further involve an input/output (I/0) interface having a JTAG function, a shift register for compacting signals provided by the I/O interface into signatures, a boundary scan circuit to realize the JTAG function, for receiving the signatures from the shift register and transferring them to the outside with a scanning operation, and a control circuit for controlling signal transmission between the shift register and the boundary scan circuit.

The test facilitating circuit may further involve a converter for converting, if an address selected by the first selector during the execution of the test program is outside the cache memory, the outside address into an address that is inside the cache memory, and a second selector for selecting, according to a mode specified by the mode register, one of the addresses provided by the converter and first selector and supplying the selected address to the cache control unit.

The test facilitating circuit may further involve a frequency doubler for doubling the frequency of an external clock signal, a frequency divider for dividing the frequency of the output of the frequency doubler, an adjuster for adjusting a fluctuation in the phase of an internal clock signal, and a clock selector for selecting the output of the frequency doubler as a clock signal to write the test program into the cache memory and read the test results from the cache memory to the outside, and the output of the frequency divider as a clock signal to run the test program to test the internal circuits of the microprocessor.

The test facilitating circuit may further involve a logic circuit for providing an exclusive OR of external clock signals having different phases, to generate an internal clock signal whose frequency is higher than those of the external clock signals. One of the external clock signals is used to write the test program into the cache memory and read the test results from the cache memory to the outside. The internal clock signal is used to run the test program to test the internal circuits of the microprocessor.

The test facilitating circuit may further involve a modeling circuit for generating a model of a response signal that is returned from the outside in response to a control signal provided by the microprocessor to the outside, and a response selector for selecting one of the model response signal provided by the modeling circuit and a response signal returned from the outside and supplying the selected signal to the internal circuits of the microprocessor.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 4 shows a test facilitating circuit of a microprocessor according to a fourth embodiment of the present invention;

FIG. 5 shows a test facilitating circuit of a microprocessor according to a fifth embodiment of the present invention;

DETAILED DESCRIPTION OF THE EMBODIMENTS

The embodiments of the present invention will be described with reference to the accompanying drawings.

First Embodiment

Figure 1:
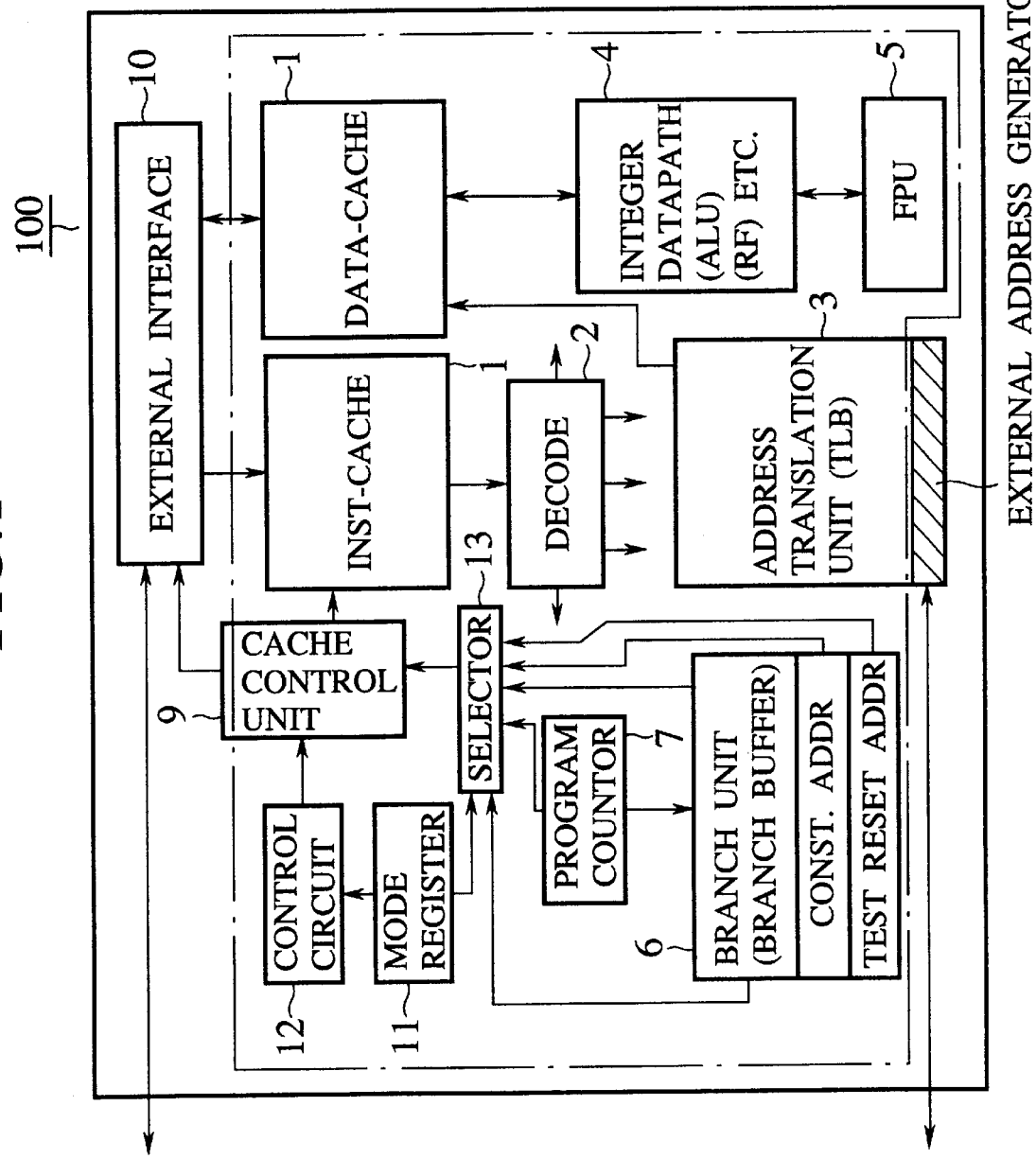
FIG. 1 shows a test facilitating circuit of a microprocessor according to a first embodiment of the present invention.

FIG. 1 shows a test facilitating circuit of a microprocessor according to the first embodiment of the present invention. The microprocessor 100 has a cache memory 1 made of an instruction cache and a data cache, a decoder 2 for decoding an instruction to execute, an address translation unit 3 such as a translation look-aside buffer (TLB) for translating a logical address into a physical address, an operation unit 4 such as an integer data path, ALU, or RF and a floating point unit 5 for executing the instruction decoded by the decoder 2, a sequence control unit 6 such as a branch unit or a branch buffer for controlling the sequence of execution of instructions, a program counter 7, a selector 13 for selecting one of the addresses provided by the sequence control unit 6 and program counter 7, a cache control unit 9 for controlling an access to the cache memory 1 based on the address selected by the selector 13, and an external interface 10 for interfacing data transmission between the outside and the cache memory 1. The address translation unit 3 has an external address generator 31 for generating an address of an external circuit.

The test facilitating circuit of the microprocessor 100 carries out a built-in test on the microprocessor 100 and involves a mode register 11 for storing data to indicate a test mode or a normal mode, a control circuit 12 for controlling the cache control unit 9 under the control of the mode register 11, and the selector 13 for selecting, under the control of the mode register 11, an address supplied to the cache control unit 9.

Figure 6A:
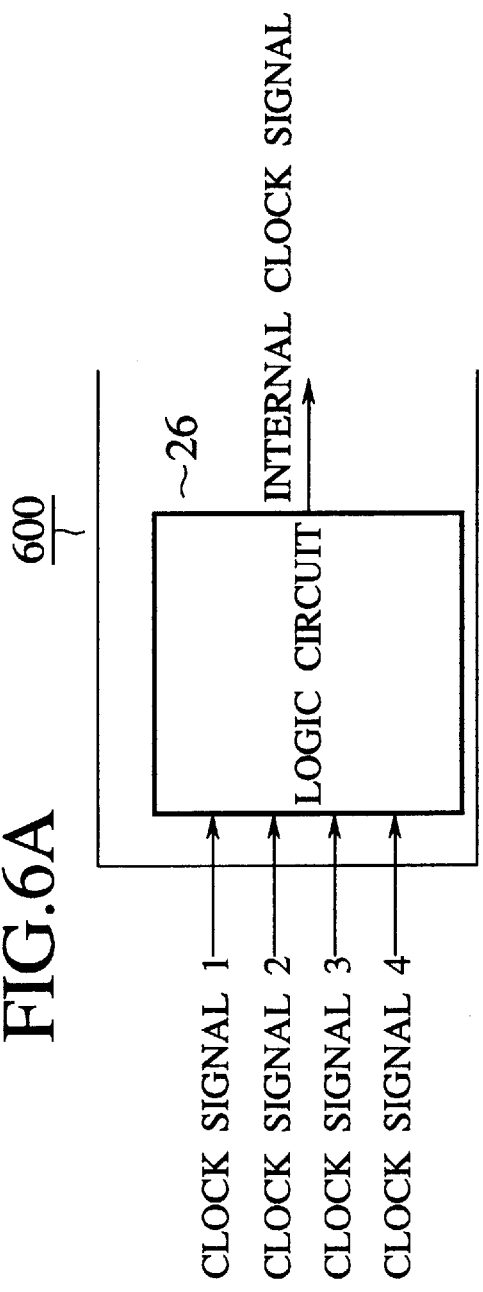
FIG. 6A shows a test facilitating circuit of a microprocessor according to a sixth embodiment of the present invention.
Figure 6B:
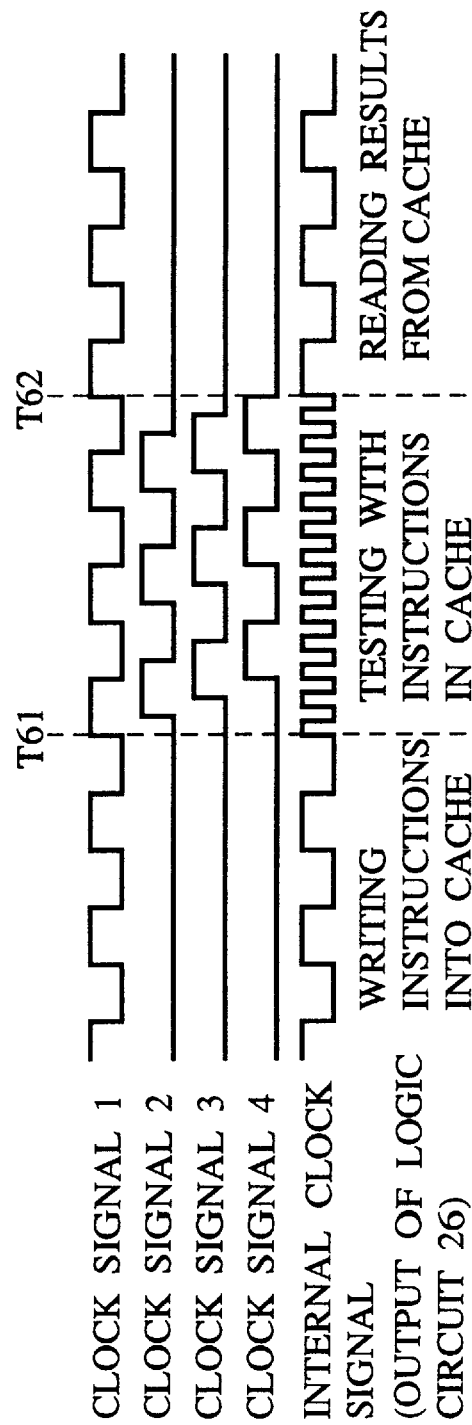
FIG. 6B is a timing chart showing the operation of the test facilitating circuit of FIG. 6A.
Figure 7:
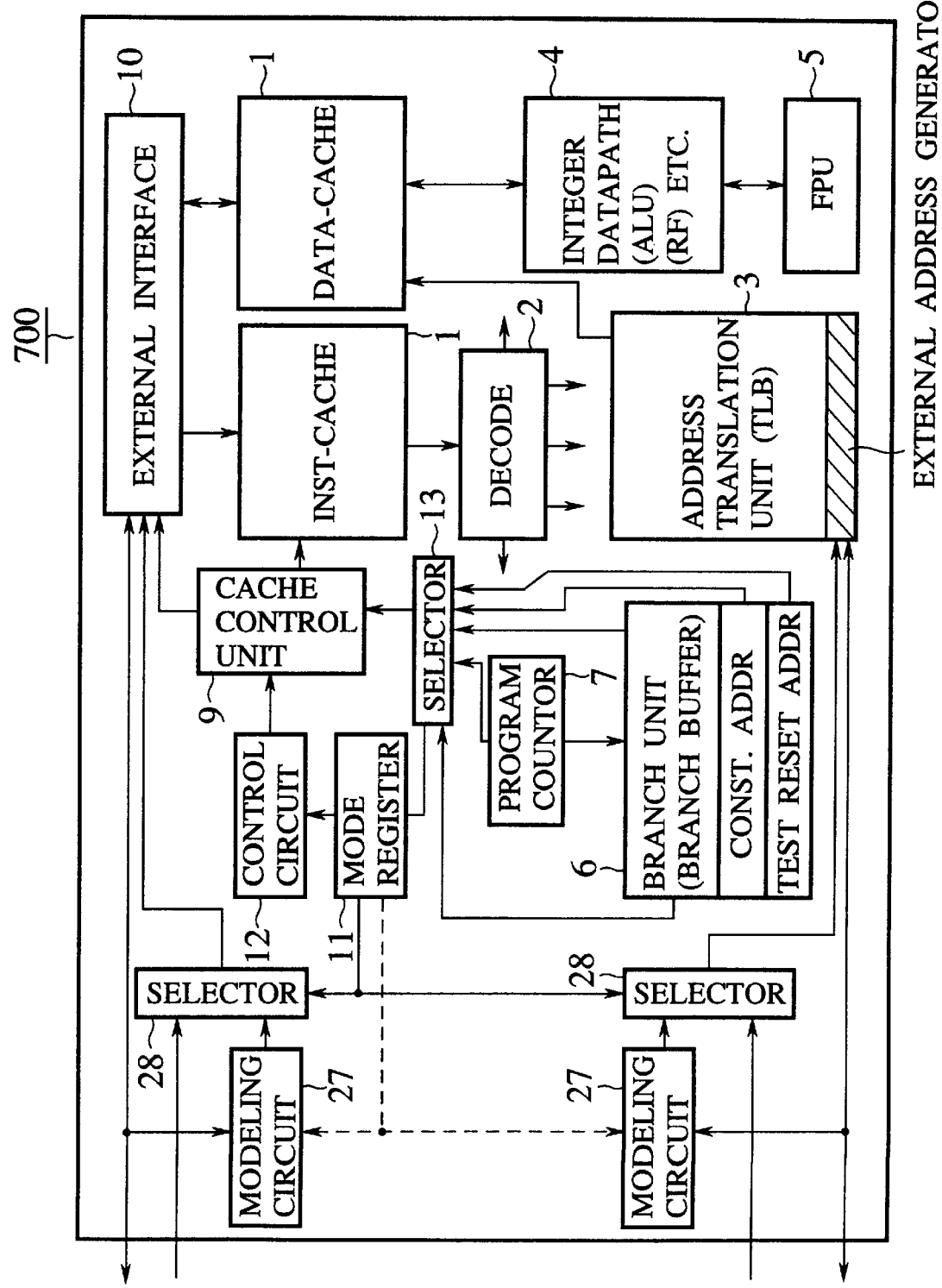
FIG. 7 shows a test facilitating circuit of a microprocessor according to a seventh embodiment of the present invention.
Figure 8:
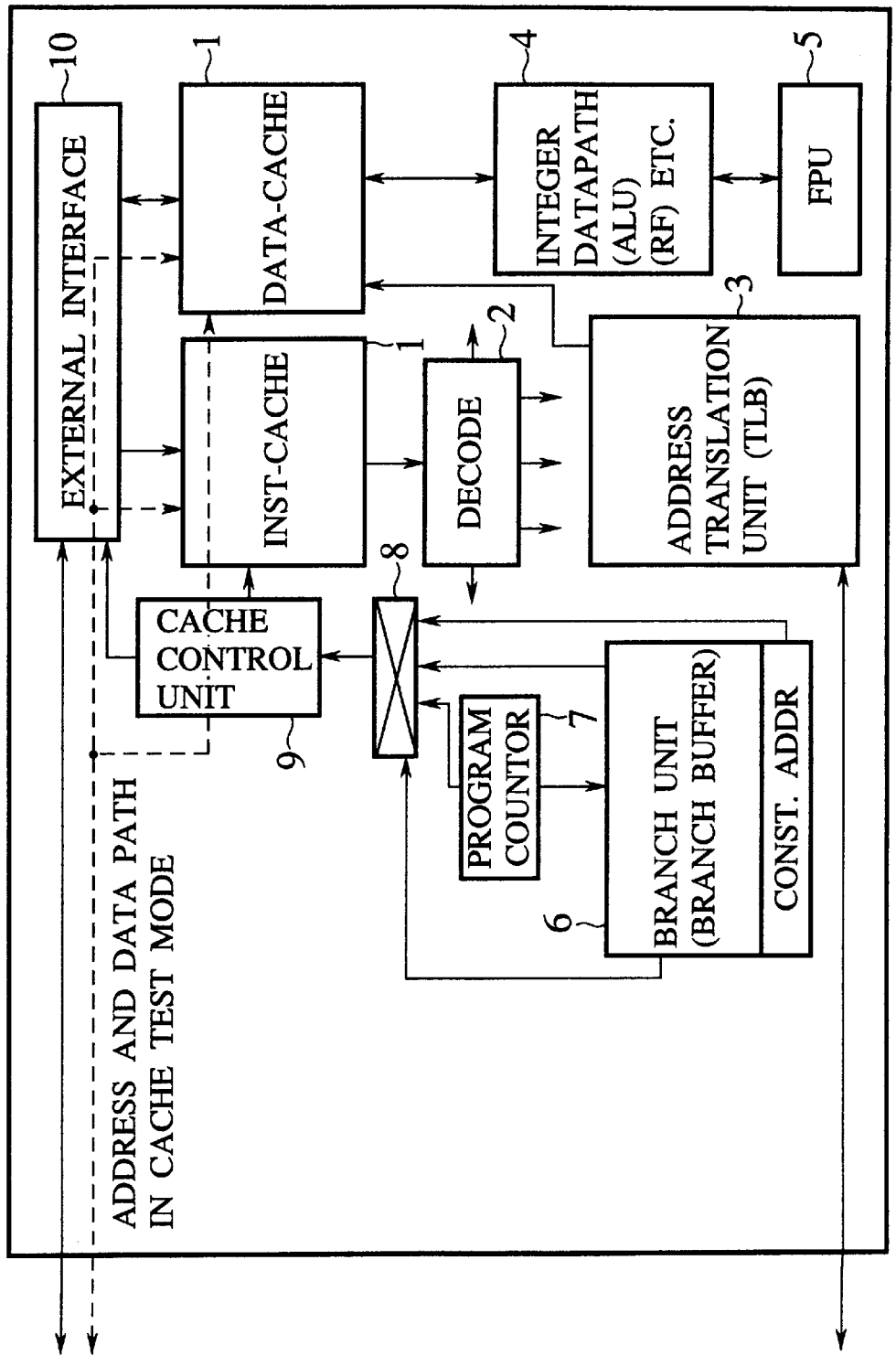
FIG. 8 shows a test circuit of a microprocessor according to a prior art.

The same parts as those of the conventional microprocessor of FIG. 8 are represented with like reference marks in FIGS. 1 to 7, and the explanation thereof is omitted.

The mode register 11 stores control data to indicate a test mode for testing the microprocessor 100 or a normal operation mode. The control data held in the mode register 11 is not affected by the resetting of the microprocessor 100. The mode register 11 may be a part of a register usually provided for a microprocessor to store the structure of external circuits, or a part of instructions of a JTAG function available for a user. The JTAG function is one of the test standards of IEEE and works independently of the inside of a microprocessor.

The mode register 11 is used to switch the microprocessor 100 between the test mode and the normal operation mode.

The control circuit 12 is incorporated in a control section of the cache memory 1 and keeps the cache memory 1 in a hit state depending on the mode specified by the mode register 11. Namely, the control circuit 12 prevents a cache miss and refill to occur in the cache memory 1 in the test mode.

The selector 13 is arranged in an address generating path and selects, according to the mode specified by the mode register 11, an address in the cache memory 1 upon the resetting of the microprocessor. More precisely, the selector 13 selects a test reset address that is provided by the sequence control circuit 6 when the test is started. The test reset address indicates the head of the test program and is transferred from the selector 13 to the cache control unit 9. Thereafter, the selector 13 selects an address provided by the program counter 7 and provides the selected address to the cache control unit 9.

After the microprocessor 100 is reset in the normal operation mode, the sequence control unit 6 provides a specific address or a constant address that is not in the cache memory and needs no address translation.

If the mode register 11 specifies the test mode, the test reset address to access an instruction in the cache memory 1 is selected to start executing the test program that has been written in the cache memory 1 under the cache test mode. Results of the test are successively stored in the data cache of the cache memory 1 without providing them to an external tester (not shown).

Namely, in the test mode, test results are successively written into the data cache in response to store instructions, etc. After the completion of the test, the test results are transmitted from the data cache to the external tester under the cache test mode. The tester compares the test results with expected values and determines whether or not the microprocessor 100 has defects.

The test facilitating circuit of the first embodiment is capable of testing most of the internal circuits of the microprocessor 100 surrounded with a dot-and-dash line in FIG. 1 except the external interface 10 and external address generator 31. More precisely, the test facilitating circuit of the first embodiment is capable of testing the address translation unit 3, the operation block 4, most of the sequence control unit 6, and the decoder 2.

Reading data out of an external memory according to, for example, a load instruction is also testable by writing the data in question into the data cache of the cache memory 1 in advance.

The test facilitating circuit of the first embodiment is incapable of testing the external address generator 31 for sending and receiving data to and from the outside of the microprocessor 100, and an external address generating section in the external interface 10. These elements are testable with the embodiments mentioned below.

As mentioned above, the test facilitating circuit of the first embodiment employs the function of writing and reading data to and from the internal cache memory 1 when testing the microprocessor 100. In a normal operation, the microprocessor 100 fetches an external instruction after the microprocessor 100 is reset. If the mode register 11 specifies the test mode, the cache memory 1 is used to execute the test program and store test results until the test program is completely executed. After the completion of the test, an external tester reads the test results out of the cache memory 1, examines the test results, and determines whether or not the microprocessor 100 has defects. The test facilitating circuit of the first embodiments is compact in the microprocessor 100 and is capable of testing the actual specifications of most of the circuits incorporated in the microprocessor 100 with the use of an inexpensive tester having a small number of pins and employing low frequencies, thereby reducing testing costs.

Second Embodiment

Figure 2:
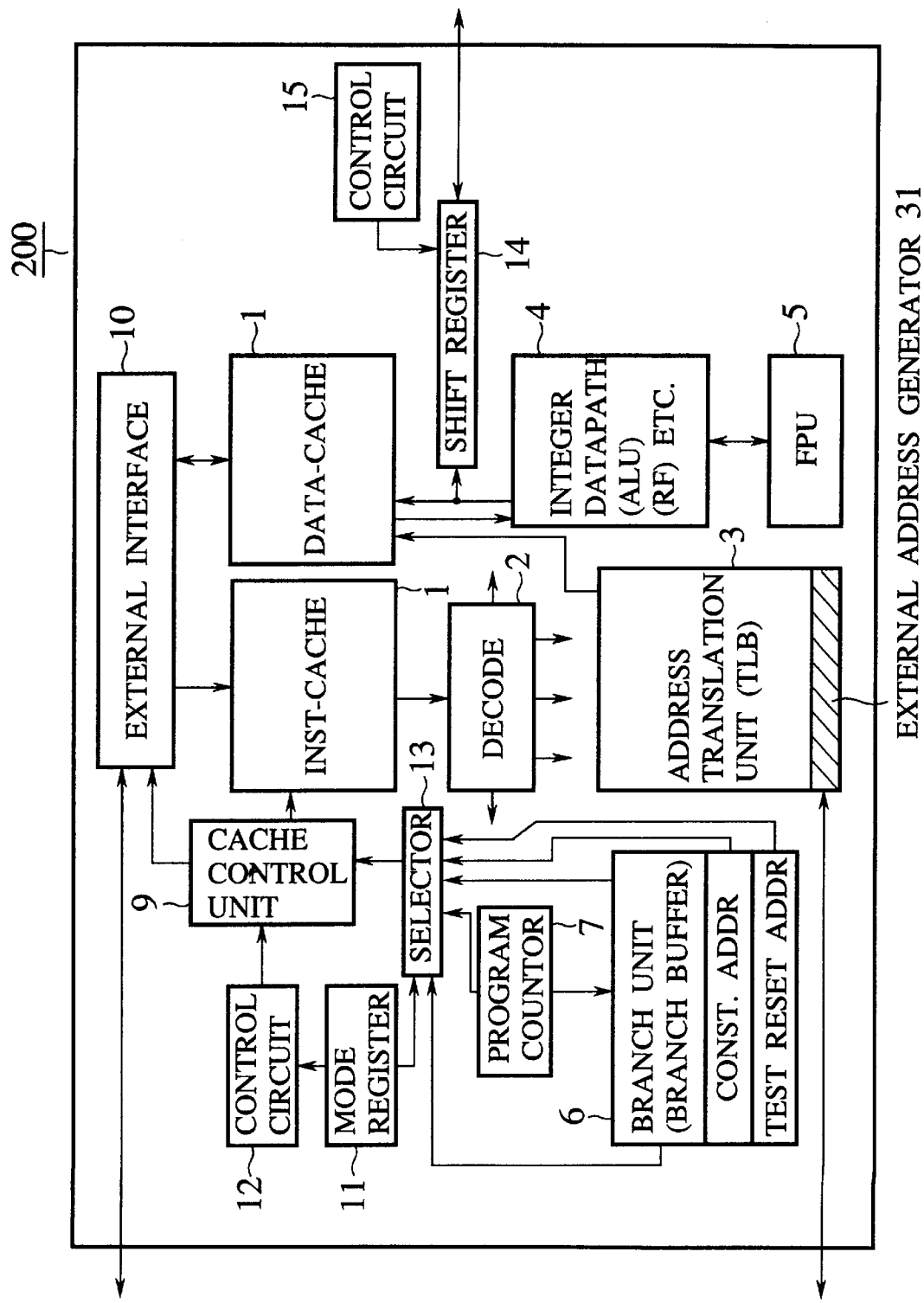
FIG. 2 shows a test facilitating circuit of a microprocessor according to a second embodiment of the present invention.

FIG. 2 shows a test facilitating circuit of a microprocessor according to the second embodiment of the present invention.

The test facilitating circuit of the second embodiment for easily testing the microprocessor 200 involves, in addition to the elements of the first embodiment of FIG. 1, a shift register 14 for compacting test results into signatures and a control circuit 15 for controlling the reading and writing of the shift register 14 in response to an external instruction or an external JTAG function. The second embodiment executes a test under a test mode and writes results of the test in the cache memory 1 as well as in the shift register 14. The shift register 14 compacts the test results into signatures, which are read by an external tester (not shown) after the completion of the test. The tester compares the test results with expected values, to determine whether or not the microprocessor 200 has defects.

Third Embodiment

Figure 3:
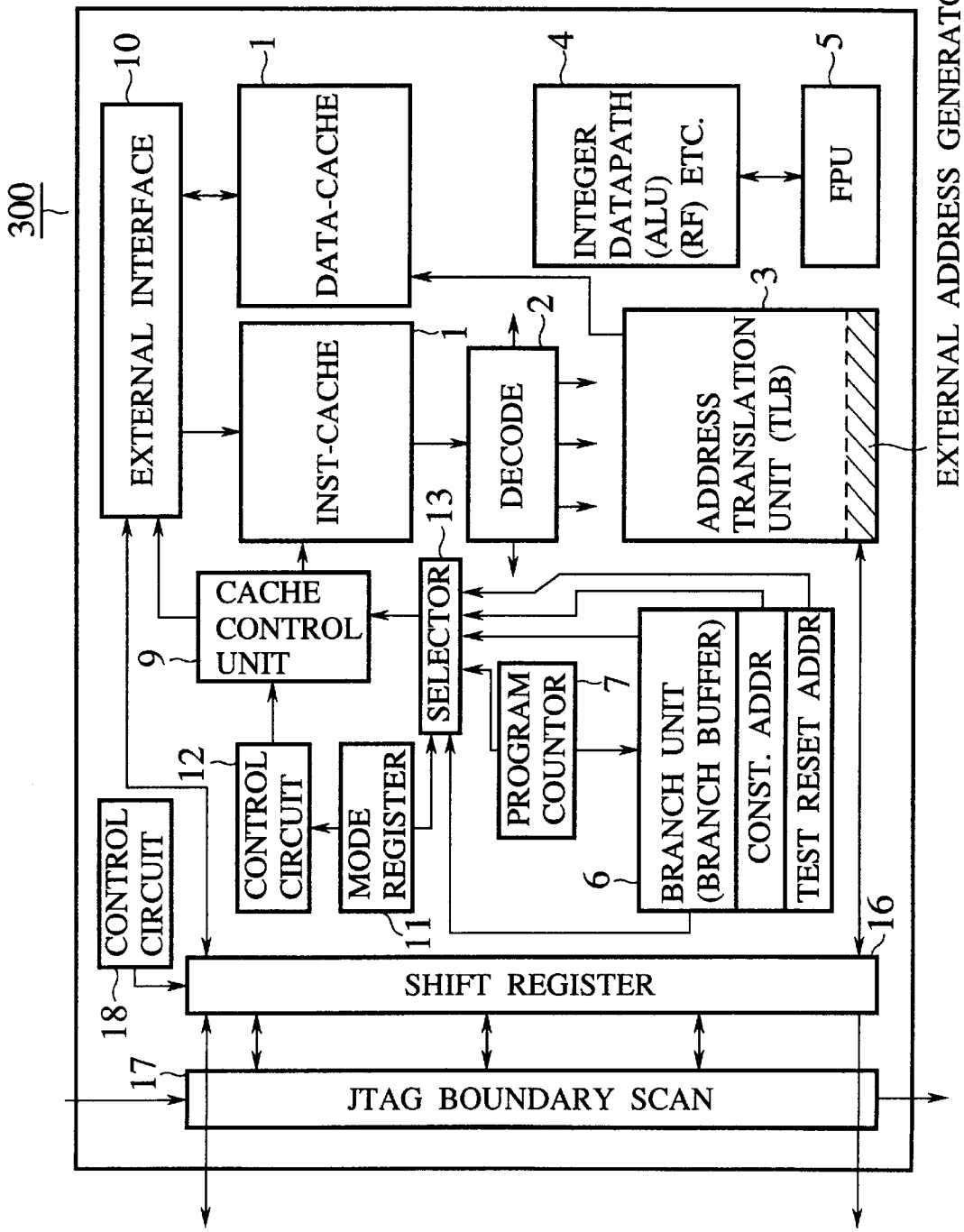
FIG. 3 shows a test facilitating circuit of a microprocessor according to a third embodiment of the present invention.

FIG. 3 shows a test facilitating circuit of a microprocessor according to the third embodiment of the present invention.

The test facilitating circuit of the third embodiment easily tests the microprocessor 300 that has a JTAG function based on IEEE standards. The test facilitating circuit involves, in addition to the elements of the first embodiment of FIG. 1, a shift register 16 for latching an output signal from an input/output (I/O) interface according to an internal clock signal and compacting the output signal into a signature, a control circuit 18 for controlling the reading and writing of the shift register 16, and a boundary scan circuit 17 serving for the JTAG function. The control circuit 18 controls the reading and writing of the shift register 16 in response to JTAG instructions so that an external tester (not shown) may collect the output of the I/O interface through the boundary scan circuit 17.

The first and second embodiments may test the operation unit 4, etc., with the test program stored in the cache memory 1 and store test results in the cache memory 1 and shift register 14. The first and second embodiments, however, are unable to trace addresses after they are translated or control signals supplied to the outside because these translated addresses and control signals are not passed through the paths to the cache memory 1.

The third embodiment solves this problem. The third embodiment compacts the output of the I/0 interface into signatures and lets an external tester collect the signatures. The signature compaction is carried out by the shift register 16, which is formed without affecting the layout of the microprocessor 300 because elements of the I/O interface are usually arranged at the periphery of an LSI chip.

Signature compaction initial values are set before the test with the use of the boundary scan circuit 17. After the test, test results are read by the external tester through the boundary scan circuit 17. Consequently, the test facilitating circuit of the third embodiment is realized with a minimum number of additional parts.

Fourth Embodiment

FIG. 4 shows a test facilitating circuit of a microprocessor according to the fourth embodiment of the present invention.

The test facilitating circuit of the fourth embodiment for easily testing the microprocessor 400 involves, in addition to the elements of the first embodiment of FIG. 1, a converter 19 for converting, if an address outside the cache memory 1 is generated during the execution of a test program, the outside address into an address that is inside the cache memory 1. The test facilitating circuit also involves a selector 20 controlled by the mode register 11, for selecting an address provided by the converter 19 or a normal address.

Generally, higher bits of an address specify an address space. If a given address is outside the cache memory 1, the converter 19 converts the higher bits thereof so that the converted address may specify a space in the cache memory 1. Namely, the operation of the converter 19 is very simple.

Similar to a reset operation, an interrupt operation or an exception operation branches to a specific address that is outside the cache memory 1 and needs no address translation. Accordingly, it is impossible to put any routine for the interrupt or exception operation in the cache memory 1. This is the reason why the first embodiment is unable to test such a routine.

The converter 19 of the fourth embodiment solves this problem. The converter 19 converts any address that branches to the outside of the cache memory 1 into one that is inside the cache memory 1.

The fourth embodiment is capable of writing a test program including interrupt and exception routines into the cache memory 1 and executing the test program.

Fifth Embodiment

FIG. 5 shows a test facilitating circuit of a microprocessor according to the fifth embodiment of the present invention.

The microprocessor 500 of the fifth embodiment has a PLL or a DLL made of a phase comparator 21, a charge pump 22, a VCO (voltage-controlled oscillator) 23, and a frequency divider 24, for adjusting the phase difference of a clock signal used to operate the microprocessor 500. The test facilitating circuit of the fifth embodiment for easily testing the microprocessor 500 involves, in addition to the elements of the first embodiment of FIG. 1, a selector 25 for selecting, under the control of the mode register 11, the output of the VCO 23 whose frequency is double that of an external clock signal or the output of the frequency divider 24 whose frequency is half that of the external clock signal. The selected clock signal is used as an internal clock signal. Even if the external clock signal is of low speed, the fifth embodiment is capable of testing the microprocessor 500 with a high-frequency clock signal.

In a cache test mode, the low-speed clock signal that fits the specification of a tester (not shown) is used to write a test program into the cache memory 1 and read test results from the cache memory 1. Only when executing the test program stored in the cache memory 1, the high-speed clock signal is used so that the test is carried out at a frequency that is higher than the maximum frequency of the microprocessor to be tested. The fifth embodiment is capable of using an inexpensive tester operating at low frequencies to test a microprocessor with a high-speed clock signal.

Sixth Embodiment

FIG. 6A shows a test facilitating circuit of a microprocessor according to the sixth embodiment of the present invention, and FIG. 6B is a timing chart showing the operation of the circuit of FIG. 6A.

Instead of the PLL of the fifth embodiment of FIG. 5 for adjusting the phase difference of a clock signal, the sixth embodiment employs a logic circuit 26 for providing an exclusive OR of external clock signals 1 to 4 having different phases. These clock signals 1 to 4 are delayed from one another as shown in a period between T61 and T62 in FIG. 6B and are supplied from a tester (not shown) to the microprocessor 600. The logic circuit 26 provides an exclusive OR of the clock signals 1 to 4, to generate a high-frequency internal clock signal for the microprocessor 600, as shown in the period between T61 and T62 in FIG. 6B.

Similar to the microprocessor 500 of the fifth embodiment, the microprocessor 600 of the sixth embodiment executes a test program stored in the cache memory 1 at a high frequency that is equivalent to the specified maximum frequency of the microprocessor 600.

Seventh Embodiment

FIG. 7 shows a test facilitating circuit of a microprocessor according to the seventh embodiment of the present invention.

The test facilitating circuit of the seventh embodiment for easily testing the microprocessor 700 involves, in addition to the elements of the first embodiment of FIG. 1, a modeling circuit 27 for internally generating a response signal that is returned by an external circuit in response to a control signal provided by an I/O interface of the microprocessor 700 to the external circuit. An example of such a response signal is an acknowledge signal provided by an external memory in response to a request signal provided by the microprocessor 700 to the external memory. The modeling circuit 27 is paired with a selector 28 and is controlled by the mode register 11. The microprocessor 700 incorporates a predetermined number of pairs of the modeling circuit 27 and selector 28. In FIG. 7, the microprocessor 700 has two pairs of them.

Under the control of the mode register 11, the modeling circuit 27 generates a simple (dummy) response signal, and the selector 28 selects the dummy response signal or an externally supplied response signal. Also under the control of the mode register 11, the selected response signal is supplied to the address translation unit 3 or the external interface 10. Namely, the address translation unit 3 or the external interface 10 provides a request signal to an external circuit, and a response signal for the request signal from the external circuit is generated in the microprocessor 700.

In this way, the seventh embodiment generates, in the microprocessor 700, a simplified model of a response signal of an external circuit in the test mode. This eliminates the need of transmitting a response signal from the external circuit when carrying out a test. Namely, the seventh embodiment needs no response processes with respect to external circuits during the test. After the test, an external tester simply collects test results and examines them. Consequently, the seventh embodiment can employ an inexpensive tester having a small number of pins and operating at low frequencies.

Processes of a microprocessor that involve input signals are mostly caused by instructions, and most of response signals such as acknowledge signals from external circuits are simple. Accordingly, no large I/O circuits are needed for these signals. The seventh embodiment increases the number of bits of the mode register 11 to generate a plurality of response patterns and employs pairs of the modeling circuit 27 and selector 28 to cope with a test program that involves signal communication with external circuits.

The first to seventh embodiments mentioned above may properly be combined together to provide the effect of the present invention.

As explained above, the first to seventh embodiments are capable of simply testing microprocessors. These embodiments enable a tester having a small number of pins to properly test microprocessors if the number of pins used for a cache test mode is reduced by a multiplexing technique.

Employing a test program to test a microprocessor involves a smaller number of test vectors compared with a conventional test that must observe pin timing. Accordingly, the test-program-using test reduces the test vector reading time of a tester as well as the capacity of a tester's vector memory.

The present invention is effective, in particular, in sorting wafers. Namely, the present invention is effective to examine the functions of wafers and check to see whether or not the internal frequency characteristics of the wafers meet specifications.

When carrying out a test, the present invention uses no high frequencies for data transfer. Namely, there is no need of considering deterioration in high-frequency signals due to probe cards.

The present invention is capable of testing many functions at a maximum frequency when sorting microprocessors, to exclude defective ones before packaging. This results in reducing packaging cost.

In a final inspection after packaging, a standard tester having many pins may be used in a normal mode to carry out a contact check, an I/O AC timing check, and a cache memory fetch/refill check on the sorted microprocessors. This greatly simplifies the final inspection and minimizes a time for using the tester having many pins. The present invention can carry out a perfect microprocessor test equivalent to that realized by the prior art that employs an expensive tester having many pins and operating at high frequencies.

As explained above in detail, the test facilitating circuit of a microprocessor of the present invention is capable of surely reading a test program from a cache memory without a cache miss and easily carrying out a built-in test at low cost.

In addition, the test facilitating circuit of the present invention is capable of improving test efficiency by collecting test results, compacting them into signatures, and providing the signatures to the outside.

In addition, the test facilitating circuit of the present invention is capable of testing branch processes such as interrupts and exceptions by converting a branch address caused by interrupt/exception into an address that is inside a cache memory.

In addition, the test facilitating circuit of the present invention is capable of using a low-speed tester to test a microprocessor at the maximum operation frequency thereof.

In addition, the test facilitating circuit of the present invention is capable of using an inexpensive tester to test a microprocessor by internally generating response signals instead of receiving the response signals from the tester.

While the above provides a full and complete disclosure of the preferred embodiments of the present invention, various modifications, alternate constructions, and equivalents may be employed without departing from the true spirit and scope of the invention. Therefore, the above description and illustration should not be construed as limiting the scope of the invention, which is defined by the appended claims.

What is claimed is:

1. A test facilitating circuit of a microprocessor, comprising:
   a mode register for storing control data to selectively set a test mode and a normal operation mode, the test mode testing the microprocessor independently of the resetting of the microprocessor;
   a cache memory having a cache test mode function to allow the outside to directly write and read data to and from said cache memory, the cache test mode function being used to write a test program into said cache memory, the test program being executed in the test mode to test internal circuits of the microprocessor, test results provided by the test program being stored in said cache memory so that the outside may read the test results out of said cache memory;
   an address generator for generating a start address to access the test program in said cache memory;
   a first selector for selecting the start address generated by said address generator when the control data in said mode register indicates the test mode, supplying the selected start address to a cache control unit that controls an access to said cache memory, selecting an address of the test program that follows the start address, and supplying the selected address to the cache control unit; and
   a control circuit for keeping said cache memory in a hit state during the test mode so that no cache miss occurs when said cache memory is accessed during the test mode.

2. The test facilitating circuit of claim 1, further comprising:
   a shift register for successively compacting the test results into signatures and storing the signatures so that the outside may read the signatures; and
   a control circuit for controlling the reading and writing of the shift register.

3. The test facilitating circuit of claim 2, further comprising:
   an input/output interface having a JTAG function;
   a shift register for compacting signals provided by the input/output interface into signatures;
   a boundary scan circuit to realize the JTAG function, for receiving the signatures from the shift register and transferring them to the outside with a scanning operation; and
   a control circuit for controlling signal transmission between the shift register and the boundary scan circuit.

4. The test facilitating circuit of claim 2, further comprising:
   a converter for converting, if an address selected by said first selector during the execution of the test program is outside said cache memory, the outside address into an address that is inside said cache memory; and
   a second selector for selecting, according to a mode specified by said mode register, one of the addresses provided by the converter and said first selector and supplying the selected address to the cache control unit.

5. The test facilitating circuit of claim 2, further comprising:
   a frequency doubler for doubling the frequency of an external clock signal;
   a frequency divider for dividing the frequency of the output of the frequency doubler;
   an adjuster for adjusting a fluctuation in the phase of an internal clock signal; and
   a clock selector for selecting the output of the frequency doubler as a clock signal to write the test program into said cache memory and read the test results from said cache memory to the outside, and the output of the frequency divider as a clock signal to run the test program to test the internal circuits of the microprocessor.

6. The test facilitating circuit of claim 2, further comprising:
   a logic circuit for providing an exclusive OR of external clock signals having different phases, to generate an internal clock signal whose frequency is higher than those of the external clock signals, one of the external clock signals being used to write the test program into said cache memory and read the test results from said cache memory to the outside, the internal clock signal being used to run the test program to test the internal circuits of the microprocessor.

7. The test facilitating circuit of claim 2, further comprising:
   a modeling circuit for generating a model of a response signal that is returned from the outside in response to a control signal provided by the microprocessor to the outside; and
   a response selector for selecting one of the model response signal provided by the modeling circuit and a response signal returned from the outside and supplying the selected signal to the internal circuits of the microprocessor.

8. The test facilitating circuit of claim 1, further comprising:
   an input/output interface having a JTAG function;
   a shift register for compacting signals provided by the input/output interface into signatures;
   a boundary scan circuit to realize the JTAG function, for receiving the signatures from the shift register and transferring them to the outside with a scanning operation; and
   a control circuit for controlling signal transmission between the shift register and the boundary scan circuit.

9. The test facilitating circuit of claim 8, further comprising:
   a converter for converting, if an address selected by said first selector during the execution of the test program is outside said cache memory, the outside address into an address that is inside said cache memory; and
   a second selector for selecting, according to a mode specified by said mode register, one of the addresses provided by the converter and said first selector and supplying the selected address to the cache control unit.

10. The test facilitating circuit of claim 8, further comprising:
    a frequency doubler for doubling the frequency of an external clock signal;
    a frequency divider for dividing the frequency of the output of the frequency doubler;
    an adjuster for adjusting a fluctuation in the phase of an internal clock signal; and
    a clock selector for selecting the output of the frequency doubler as a clock signal to write the test program into said cache memory and read the test results from said cache memory to the outside, and the output of the frequency divider as a clock signal to run the test program to test the internal circuits of the microprocessor.

11. The test facilitating circuit of claim 8, further comprising:
    a logic circuit for providing an exclusive OR of external clock signals having different phases, to generate an internal clock signal whose frequency is higher than those of the external clock signals, one of the external clock signals being used to write the test program into said cache memory and read the test results from said cache memory to the outside, the internal clock signal being used to run the test program to test the internal circuits of the microprocessor.

12. The test facilitating circuit of claim 8, further comprising:
    a modeling circuit for generating a model of a response signal that is returned from the outside in response to a control signal provided by the microprocessor to the outside; and
    a response selector for selecting one of the model response signal provided by the modeling circuit and a response signal returned from the outside and supplying the selected signal to the internal circuits of the microprocessor.

13. The test facilitating circuit of claim 1, further comprising:
    a converter for converting, if an address selected by said first selector during the execution of the test program is outside said cache memory, the outside address into an address that is inside said cache memory; and
    a second selector for selecting, according to a mode specified by said mode register, one of the addresses provided by the converter and said first selector and supplying the selected address to the cache control unit.

14. The test facilitating circuit of claim 13, further comprising:
    a frequency doubler for doubling the frequency of an external clock signal;
    a frequency divider for dividing the frequency of the output of the frequency doubler;
    an adjuster for adjusting a fluctuation in the phase of an internal clock signal; and
    a clock selector for selecting the output of the frequency doubler as a clock signal to write the test program into said cache memory and read the test results from said cache memory to the outside, and the output of the frequency divider as a clock signal to run the test program to test the internal circuits of the microprocessor.

15. The test facilitating circuit of claim 1, further comprising:
    a frequency doubler for doubling the frequency of an external clock signal;
    a frequency divider for dividing the frequency of the output of the frequency doubler;
    an adjuster for adjusting a fluctuation in the phase of an internal clock signal; and
    a clock selector for selecting the output of the frequency doubler as a clock signal to write the test program into said cache memory and read the test results from said cache memory to the outside, and the output of the frequency divider as a clock signal to run the test program to test the internal circuits of the microprocessor.

16. The test facilitating circuit of claim 1, further comprising:
    a logic circuit for providing an exclusive OR of external clock signals having different phases, to generate an internal clock signal whose frequency is higher than those of the external clock signals, one of the external clock signals being used to write the test program into said cache memory and read the test results from said cache memory to the outside, the internal clock signal being used to run the test program to test the internal circuits of the microprocessor.

17. The test facilitating circuit of claim 1, further comprising:
    a modeling circuit for generating a model of a response signal that is returned from the outside in response to a control signal provided by the microprocessor to the outside; and
    a response selector for selecting one of the model response signal provided by the modeling circuit and a response signal returned from the outside and supplying the selected signal to the internal circuits of the microprocessor.

* * * * *